United States Patent [19]
Nishimura et al.

[11] Patent Number: 5,381,553
[45] Date of Patent: Jan. 10, 1995

[54] SIGNAL PROCESSING APPARATUS FOR PERFORMING HIGH SPEED ARITHMETIC OPERATIONS AND HAVING A POWER CONSUMPTION REDUCTION FEATURE

[75] Inventors: Yukinobu Nishimura, Himeji; Syoichi Washino; Kenji Shima, both of Amagasaki, all of Japan

[73] Assignee: Mitsubishi Denki Kabushiki Kaisha, Tokyo, Japan

[21] Appl. No.: 35,694

[22] Filed: Mar. 23, 1993

[30] Foreign Application Priority Data

Mar. 24, 1992 [JP] Japan .................................. 4-066115

[51] Int. Cl.$^6$ ....................... G06F 3/05; G06F 15/20; G06F 1/32; G06F 9/00
[52] U.S. Cl. ..................................... 395/750; 395/800; 364/222.4; 364/237.8; 364/273.1; 364/228; 364/271.9; 364/DIG. 1; 364/260
[58] Field of Search .............. 395/750, 550, 325, 425, 395/800, 775, 275; 364/724.01, 426.01, 550; 323/241; 318/568.2; 340/825.06; 324/76.11; 370/60, 94.1

[56] References Cited
U.S. PATENT DOCUMENTS

| | | | |
|---|---|---|---|
| 3,969,614 | 7/1976 | Moyer et al. | 364/431.06 |
| 4,204,249 | 5/1980 | Dye et al. | 364/200 |
| 4,237,343 | 12/1980 | Kurtin et al. | 179/1 J |
| 4,313,159 | 1/1982 | Shoap | 364/200 |
| 4,630,207 | 12/1986 | Baba | 364/431.12 |
| 4,679,077 | 7/1987 | Yuasa et al. | 358/108 |
| 4,718,057 | 1/1988 | Venkitakrishnan | 370/55 |
| 4,740,744 | 4/1988 | Lubarsky et al. | 324/76.58 |
| 4,750,111 | 6/1988 | Crosby, Jr. et al. | 364/200 |
| 4,868,773 | 9/1989 | Coyle et al. | 364/724.01 |
| 4,980,851 | 12/1990 | Komori et al. | 364/900 |
| 5,072,377 | 12/1991 | Asai et al. | 395/400 |
| 5,115,510 | 5/1992 | Okamoto et al. | 395/775 |
| 5,121,121 | 6/1992 | Grudkowski et al. | 341/172 |
| 5,167,024 | 11/1992 | Smith et al. | 395/375 |
| 5,274,833 | 12/1993 | Shima et al. | 395/800 |
| 5,319,787 | 6/1994 | Shima et al. | 395/800 |

FOREIGN PATENT DOCUMENTS

| | | | |
|---|---|---|---|
| 60-52301 | of 1985 | Japan | F02D 41/06 |
| 3-226883 | of 1991 | Japan | G06F 15/78 |

Primary Examiner—Gopal C. Ray
Attorney, Agent, or Firm—Sughrue, Mion, Zinn, Macpeak & Seas

[57] ABSTRACT

A signal processing apparatus enjoying a remarkably enhanced operation speed while ensuring accurate control capability due to data holding and learning control includes an A/D converter for converting an analog signal into a digital signal, a packet interface for generating a packet on the basis of the digital signal, a timing port controller for controlling the timing of operation of the A/D converter and generating output data on the basis of the packet, a power supply interruption detecting circuit for detecting a decrease in source voltage to thereby generate a power supply interruption detecting signal, and a data flow processor including a data store and a data flow loop for processing the packet in accordance with tag information contained in the packet. The data flow processor responds to the power supply interruption detecting signal to save electric power from consumption and hold the content of the data store.

6 Claims, 4 Drawing Sheets

SIGNAL PROCESSING APPARATUS FOR PERFORMING HIGH SPEED ARITHMETIC OPERATIONS AND HAVING A POWER CONSUMPTION REDUCTION FEATURE

BACKGROUND OF THE INVENTION

1. Field of the Invention

The present invention relates generally to a signal processing apparatus for the control purpose. More particularly, the invention is concerned with a signal processing apparatus for controlling operation of an internal combustion engine or other prime mover which requires high-speed arithmetic operations for obtaining output data signals such as pulse width, duty cycle and other signals from digital and/or analog input signals on a real time basis by adopting a precise control method such as learning control or a like process.

2. Description of the Related Art

Heretofore, in the field of control for internal combustion engines or like prime movers, there have been demanded precise controls which can be effectuated by learning variety of control parameters involved in a fuel control, idling speed control (ISC), ignition control, purge control, exhaust gas recirculation (EGR) control and others in an effort to enhance control accuracy as well as control performance. In particular, in order to obtain the control data on a real time basis in the course of a high-speed operation of a multi-cylinder internal combustion engine, arithmetic operation of very high speed is demanded. For a better understanding of the present invention, background techniques thereof will be elucidated below in some detail.

Figure 4:
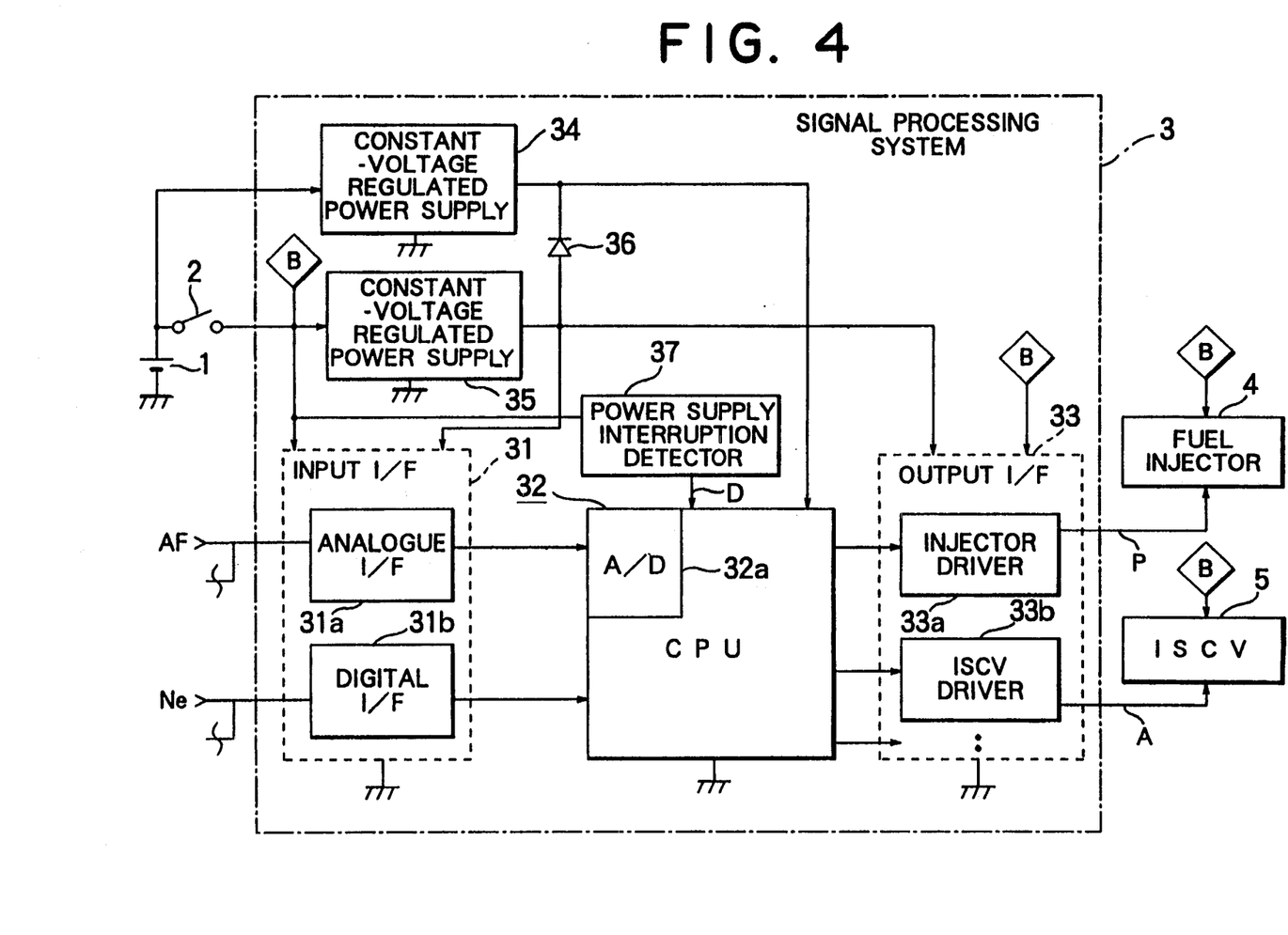
FIG. 4 is a block diagram showing a signal processing apparatus employed heretofore in the control of an internal combustion engine.

FIG. 4 is a block diagram showing a known signal processing apparatus employed heretofore in the control of an internal combustion engine (hereinafter also referred to simply as the engine).

In this figure, a reference symbol AF designates an analog air flow rate signal which can be derived from the output of a thermal-type air flow sensor (AFS), and a reference symbol Ne designates a digital engine rotation speed signal which can be derived in the form of a pulse signal from the output of a rotation speed sensor at every crank angle of 180°. Although only the air flow rate signal AF and the engine rotation speed (RPM) signal Ne are shown as typical signals which are utilized in the engine control, there may be employed other analog signals such as a water temperature signal, an intake air temperature signal and the like as well as other digital signals such as on/off signals derived from an idle switch, a starter switch and the like in the practical engine control. However, in the following description, it is assumed for the purpose of illustration only that the air flow rate signal AF and the engine rotation speed signal Ne are employed typically as the analog and digital input signals.

Referring to FIG. 4, a reference numeral 1 denotes a power supply source constituted by an onboard battery to which a signal processing apparatus generally denoted by a numeral 3 is connected through a key switch 2. As can be seen in the figure, the air flow rate signal AF and the engine rotation speed signal Ne mentioned above are input to the signal processing apparatus 3. On the other hand, connected to an output terminal of the signal processing apparatus 3 is a fuel injector 4 which is adapted to be driven by a pulse width signal P described hereinafter. Further connected to another output terminal of the signal processing apparatus 3 is an idling speed control valve (hereinafter also referred to as ISCV in abbreviation) 5 which is adapted to be driven by a speed regulation signal A. Although only the fuel injector 4 and the idling speed control valve or ISCV 5 are shown as the objects for the control, this is only for the purpose of illustration. There may be provided a desired number of objects for the control, as pointed out previously.

The signal processing apparatus 3 is comprised of various components, which will be described below.

An input interface (I/F) unit 31 for fetching various input signals including the AF signal and the Ne signal incorporates an analog input interface circuit 31a for fetching analog signals such as an air flow rate signal AF, and a digital input interface circuit 31b for fetching a digital signal such as the engine rotation speed signal Ne.

The input signals fetched through the input interface unit 31 as mentioned above are supplied to a central processing unit or CPU 32 which includes an analog-to-digital or A/D converter 32a.

Data obtained through arithmetic operations performed by the CPU 32 on the input signals are delivered to an output interface unit 33 which includes, in the case of the illustrated example, an fuel injector driver circuit 33a for outputting the pulse width signal P and an ISCV driver circuit 33b for outputting a speed regulation signal A.

A first constant-voltage regulated power supply circuit 34 is designed for generating a voltage in a range of 1 to 5 V is directly connected to the battery 1, while a second constant-voltage regulated power supply circuit 35 designed for supplying a constant voltage of 5 V is connected to the battery 1 through the key switch 2. A diode 36 is connected in the forward direction from the output terminal of the constant-voltage regulated power supply circuit 35 to that of the constant-voltage regulated power supply circuit 34. At this juncture, it should be mentioned that the constant-voltage regulated power supply circuit 34 is of a relatively small capacity and employed to supply an electric power only to the CPU 32. On the other hand, the constant-voltage regulated power supply circuit 35 is used for supplying an electric power not only to the input interface unit 31 and the output interface unit 33 but also to the CPU 32 via the diode 36 when the key switch 2 is in the closed state.

A power supply line B connected to the battery 1 through the key switch 2 is connected to the input interface unit 31 and the output interface unit 33 as well as to the fuel injector 4 and the ISCV 5.

A power supply interruption detecting circuit 37 is connected to the power supply line B for detecting lowering or drop in the voltage of the power supply line B. A power supply interruption detecting signal D outputted from this circuit 37 is supplied to the CPU 32.

Now, description will turn to operation of the hitherto known signal processing apparatus shown in FIG. 4.

The input signals such as the air flow rate signal AF, and the engine rotation speed signal Ne which are indicative of the engine operation state are inputted to the signal processing apparatus 3 through the input interface (I/F) unit 31, wherein the analog signal such as the air flow rate signal AF is processed by the analog interface (I/F) circuit 31a to be converted into a corresponding voltage signal, while the digital or discrete signal such as the engine rotation speed (RRM) signal Ne undergoes processing in the digital interface (I/F) circuit 31b to be converted into a corresponding digital voltage signal. The voltage signals output from the interface (I/F) circuits 31a and 31b are input to the CPU 32. In that case, the output voltage signal from the analog interface (I/F) circuit 31a is inputted to the CPU 32 by way of the A/D converter 32a, while the output signal of the digital interface (I/F) circuit 31b is directly supplied to the CPU 32.

The A/D converter 32a incorporated in the CPU 32 converts the analog signal inputted through, the analog interface circuit 31a into a digital signal by sampling the latter at a predetermined sampling frequency. Although only one analog input channel is shown, it should be understood that in practical applications, the A/C conversion is performed for a plurality of analog input signals by resorting to a multiplexing technique.

In general, the air flow rate analog signal is digitized by sampling it at an interval of one millisecond with other analog signals being sampled periodically at an interval of five milliseconds.

Of the output signals obtained through arithmetic operations performed by the CPU 32 on the input signals, one output signal is converted into the pulse width signal P generated in synchronism with the engine rotation speed signal Ne for driving the fuel injector 4 through the injector driver circuit 33a incorporated in the output interface 33 for thereby controlling the amount of fuel to be injected into the engine.

The other output signal of the CPU 32 is converted to the speed regulation signal A for regulating the engine rotation speed (rpm) to be constant at a desired speed for the idling operation of the engine by controlling the ISCV 5 through the ISCV driver circuit 33b and hence the amount or flow of air supplied to the engine. Parenthetically, the fuel control and the idling speed control (ISC) by themselves are known in the art. Accordingly, further description of these controls will be unnecessary.

When the key switch 1 is turned on, the constant-voltage regulated power supply circuit 35 is actuated to supply electric power to the input interface unit 31, the CPU 32 and the output interface unit 33 incorporated in the signal processing apparatus 3. On the other hand, the constant-voltage regulated power supply 34 which is of a smaller capacity when compared with that of the constant-voltage regulated supply circuit 34 operates independent of the on/off-state of the key switch 2 to supply constantly a small electric power to the CPU 32 even when the key switch 2 is in the off-state, in order to hold data and/or information stored in a memory incorporated in the CPU 32.

When the voltage on the power supply line B becomes lower or drops below a predetermined level upon turning-off of the key switch 2, the power supply interruption detecting circuit 37 produces a voltage drop signal (power supply interruption signal) D, which is then inputted to the CPU 32. In response to the voltage drop signal D, the CPU 32 assumes a stand-by state for saving power from further consumption and takes measures for holding the contents stored in the associated memory. In this conjunction, it should be noted that the memory incorporated in the CPU 32 serves for storing data or values acquired by learning, for example, through an $O_2$-sensor feedback control in the fuel injection control process as well as those learned through a rotation speed feedback control in the idling speed control process. These values or data held in the memory are constantly updated by the CPU 32 in dependence on predetermined engine operation states in order to realize the engine control with as high an accuracy as possible.

In the hitherto known signal processing apparatus described above, a single von-Neuman CPU is used for performing a variety of processings which are required to be executed on a real-time basis. As a consequence, the control performance is limited in dependence on the processing capability of the CPU, giving rise to a problem that the control performance is not to be satisfactory in respect to the processing speed as well as the accuracy as desired.

SUMMARY OF THE INVENTION

An object of the present invention is to provide a signal processing apparatus which is substantially immune to the disadvantage of the conventional apparatus described above and which can enjoy a remarkably enhanced processing speed while ensuring accurate or precise control performance due to the learning control as well as holding of data required for the intended control.

It is another object of the present invention to provide a signal processing apparatus which is capable of monitoring or modifying packet data which is undergoing or has undergone a data processing.

In view of the above and other objects which will become apparent as description proceeds, there is provided according to an aspect of the present invention a signal processing apparatus for generating a variety of output data by performing arithmetic operation on input data supplied in the form of digital signals and analog signals on a real time basis, which apparatus comprises an analog-to-digital converter for converting the analog signal into a corresponding digital signal, a packet interface for generating a packet on the basis of the digital signal, a timing port controller for controlling the timing at which the analog-to-digital converter operates and for generating the output data on the basis of the packet, a power supply interruption detecting circuit for generating a power supply interrupt signal in response to detection of a voltage drop of a power supply source, and a data flow processor including a data storage and a data flow loop for processing the packet on the basis of tag information contained in the packet, wherein the data flow processor is imparted with a function for saving power from consumption and holding contents of the data storage.

In a preferred embodiment of the signal processing apparatus described above, the packet or token includes a data portion and a tag portion containing a destination node identifier, while the data flow processor includes a plurality of join/branch chips for joining and branching of the packet (token) inputted to the data flow loop, a program memory for reading out a succeeding destination node identifier, operation code and a select code for corresponding hardware to thereby affix a new tag to the data portion in place of the existing tag, a firing processing part for generating a modified packet or token including an operation code and binomial operands on the basis of the packet outputted from the program memory, a queue buffer inserted in a feedback loop extending from the firing processing part to the program memory for queuing the packet (token), and an arithmetic operation processing part which performs arithmetic operations on the basis of the succeeding destination node identifier and information of the binomial operands both contained in the packet (token) outputted from the firing processing part in such a manner that unless the packet indicates the firing, the packet is returned to the program memory via the feedback loop while executing arithmetic operation processing when the packet indicates the firing, whereon the packet is stored in the data storage or sent out to the packet interface.

In another preferred embodiment of the signal processing apparatus according to the invention, the data flow processor may include an input/output terminal for extracting contents of the data storage to the packet interface as source signals, wherein values preset in the data storage are sent out to the packet interface via the input/output terminal in accordance with an initialization routine to allow the packet interface to latch a value from the data storage for confirming correspondence or coincidence in the data type between the input data and the output data.

With the structure of the signal processing apparatus according to the present invention, wherein the data flow processor is employed which can ensure an excellently high speed operation as well as power saving and stored data hold function effectuated in response to a power supply interrupt signal, the important data which has been acquired by learning and required for realizing the aimed control with a high accuracy can be held intact even at the time of power supply interruption so as to be utilized again when the power supply is again turned on. Besides, through cooperation of the data flow processor, the packet interface unit and the timing port controller, high speed performance can be ensured without sacrificing the control accuracy.

Besides, due to employment of the data flow processor having a high-speed operation performance, the contents of the data storage can be referenced through the input/output terminal for the purpose of monitoring or modifying the data content of the data storage while ensuring a high-speed performance as well as a high accuracy of operation.

The above and other objects, features and attendant advantages of the present invention will better be understood by reading the following description of preferred embodiments taken in conjunction with the accompanying drawings.

DESCRIPTION OF THE PREFERRED EMBODIMENTS

Now, the present invention will be described in detail in conjunction with preferred or exemplary embodiments thereof by reference to the drawings.

Figure 1:
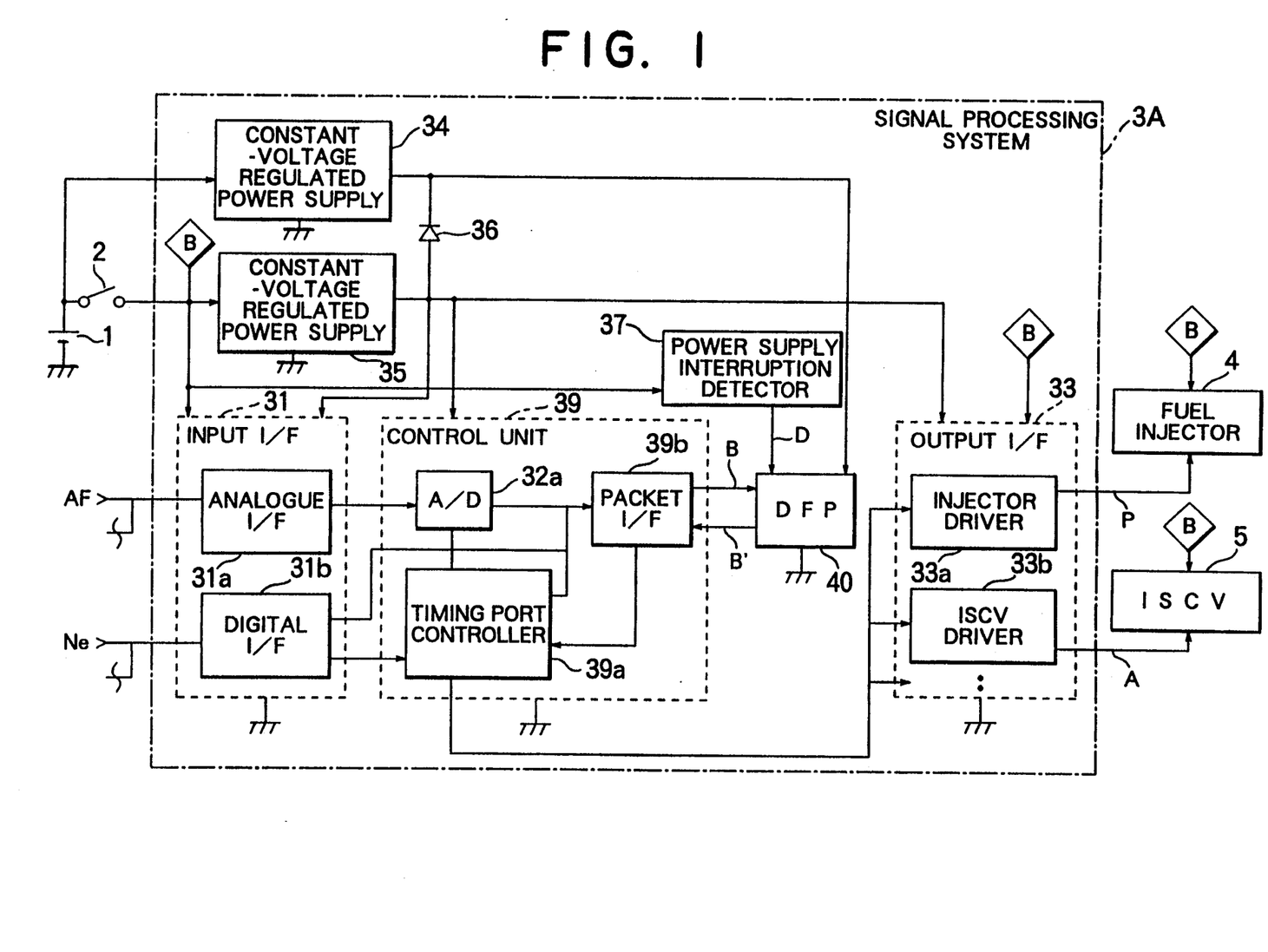
FIG. 1 is a block diagram showing schematically a general configuration of a signal processing apparatus according to an embodiment of the present invention.

FIG. 1 shows a general arrangement of a signal processing apparatus according to a first embodiment of the invention. In the figure, those parts or components which are denoted by reference numerals 1 to 5, 31, 32a and 33 to 37 serve for the functions same as or equivalent to those described hereinbefore by using like reference numerals and by referring to FIG. 4. Accordingly, repeated description of these parts or components will be unnecessary.

Referring to FIG. 1, the signal processing apparatus denoted generally by 3A includes in place of the central processing unit or CPU 32 described hereinbefore in conjunction with FIG. 4 a control unit 39 for generating a packet (token) B and a data flow processor (also referred to as DFP in abbreviation) 40 for processing the packet B to thereby generate a packet B', which is again inputted to the control unit 39.

The control unit 39 comprises an A/D converter 32a for converting an analog signal into a digital signal, a timing port controller 39a for converting the digital signal into periodical data while controlling the A/D converter 32a, and a packet interface (I/F) unit 39b for generating the packet (token) B on the basis of the input data obtained from the outputs of the A/D converter 32a, the digital interface 31b and the timing port controller 39a, respectively.

The packet B generated by the packet interface (I/F) unit 39b is input to the data flow processor 40, which processes the input packet B to thereby generate the processed packet B', the latter being input to the timing port controller 39a through the packet interface unit 39b. Output data generated by the timing port controller 39a on the basis of the processed packet B' inputted through the packet interface (I/F) unit 39b is output to the injector 4 and the idling speed control valve or ISCV 5 via the output interface unit 33 including respective driver circuits 33a and 33b.

Figure 2:
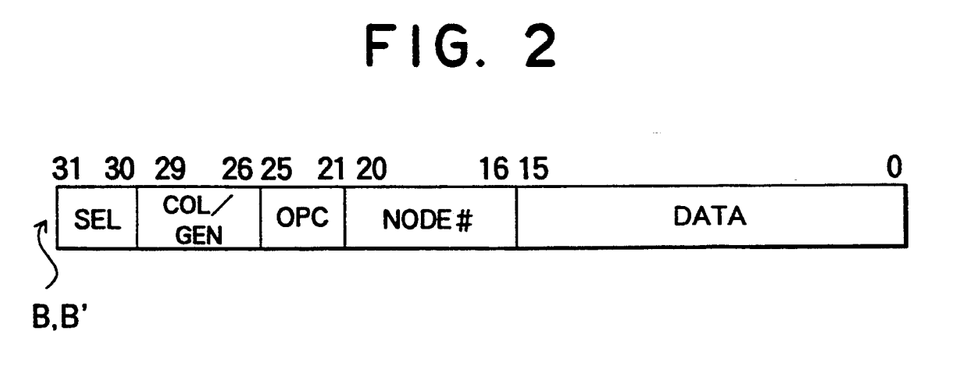
FIG. 2 is a diagram for illustrating a format of a packet (token) adopted according to the invention.

FIG. 2 shows a format structure common to the packets B and B'. Referring to the figure, each packet or token B or B' consists of, for example, 32 bits and is comprised of a data field "DATA" of sixteen bits of bit positions "0" to "15", a destination node identifier (number) field "NODE #" of five bits of bit positions "16" to "20", an operation code field "OPC" of five bits of bit positions "21" to "25", a color/generation field "COL/GEN" of three bits of bit positions "26" to "28", and a select code field "SEL" of two bits of bit positions "30" and "31", respectively.

The format structure itself of the packet (token) B or B' shown in FIG. 2 undergoes neither alteration nor change. However, the contents of the fields "NODE #" and others except for the data field "DATA", i.e., the fields which contain a tag or color information can be modified or changed through arithmetic operation or processing executed by the data flow processor (DFP) 40.

Next, referring to FIG. 2, description will be made of the operations of the signal processing apparatus shown in FIG. 1.

The A/D converter 32a constituting a part of the control unit 39 converts the analog signal input through the analog interface (I/F) 31a into a corresponding digital signal for a predetermined sampling time under the control of the timing port controller 39a. In FIG. 1, only one analog input channel is shown. This is however for the purpose of illustration only. In practice, there are provided a plurality of analog input channels for which the sampling processings are performed, respectively, by using a multiplexer, as mentioned previously. Same holds true for the digital input channels.

On the basis of the digital signal resulting from the A/D conversion mentioned above, the packet interface unit 39b generates a packet (token) B to which a destination node identifier (number #) is assigned previously, as is illustrated in FIG. 2. The packet B is then transferred to the data flow processor (DFP) 30. Further, digital or on/off data inputted through the digital interface 31b are placed in the packet B on a bit-by-bit basis.

Further, in the timing port controller 39a, a pulse train signal such as the engine rotation speed signal Ne supplied through the digital interface 31b and representing timing data is periodically counted by a counter timer incorporated in the timing port controller 39a to be subsequently input to the packet interface (I/F) unit 39b as periodical data. In response, the packet interface (I/F) unit 39b generates the periodical data in the form of the packet B which is then transferred to the data flow processor 40. At this time, the generation data "GEN" required for the learning control is added.

Subsequently, from the data obtaining through the arithmetic operations executed by the data flow processor 40, data corresponding to the pulse width signal P for the fuel injection control is selected by the packet interface (I/F) unit 39b to be sent out as the processed packet B' to the timing port controller 39a, which then sends out data based on the packet B' to the injector 4 and the ISCV 5 via the output interface unit 33 as the output data for the timing control. Incidentally, as a unit having both functions of the A/D converter 32a and the timing port controller 39a, there is known a universal pulse processor or UPP.

At this juncture, description will be made of node assignment operation involved in generation of the packet from various input data in the packet interface unit 39b.

When the key switch 2 is closed to thereby turn on the battery 1, an initialization routine for the data flow processor 40 is performed by the control unit 39, whereby values set previously in a data store incorporated in the data flow processor 40 are supplied to the packet interface (I/F) unit 39b. By latching these values, the packet interface unit 39b generates a packet by establishing correspondence relative to the input data and the type thereof.

The control unit 39 of the signal processing apparatus 3A is controlled through the initialization routine by using the data set preparatorily in the data store in the initial phase which succeeds the turn-on of the power supply or battery. On the other hand, when the key switch 2 is closed during operation under power supply from the constant-voltage regulated power supply 34, the control unit 39 operates on the basis of the contents stored in a RAM (random access memory) which constitutes a part of the data store and in which at least a part of the initialization data is held.

Figure 3:
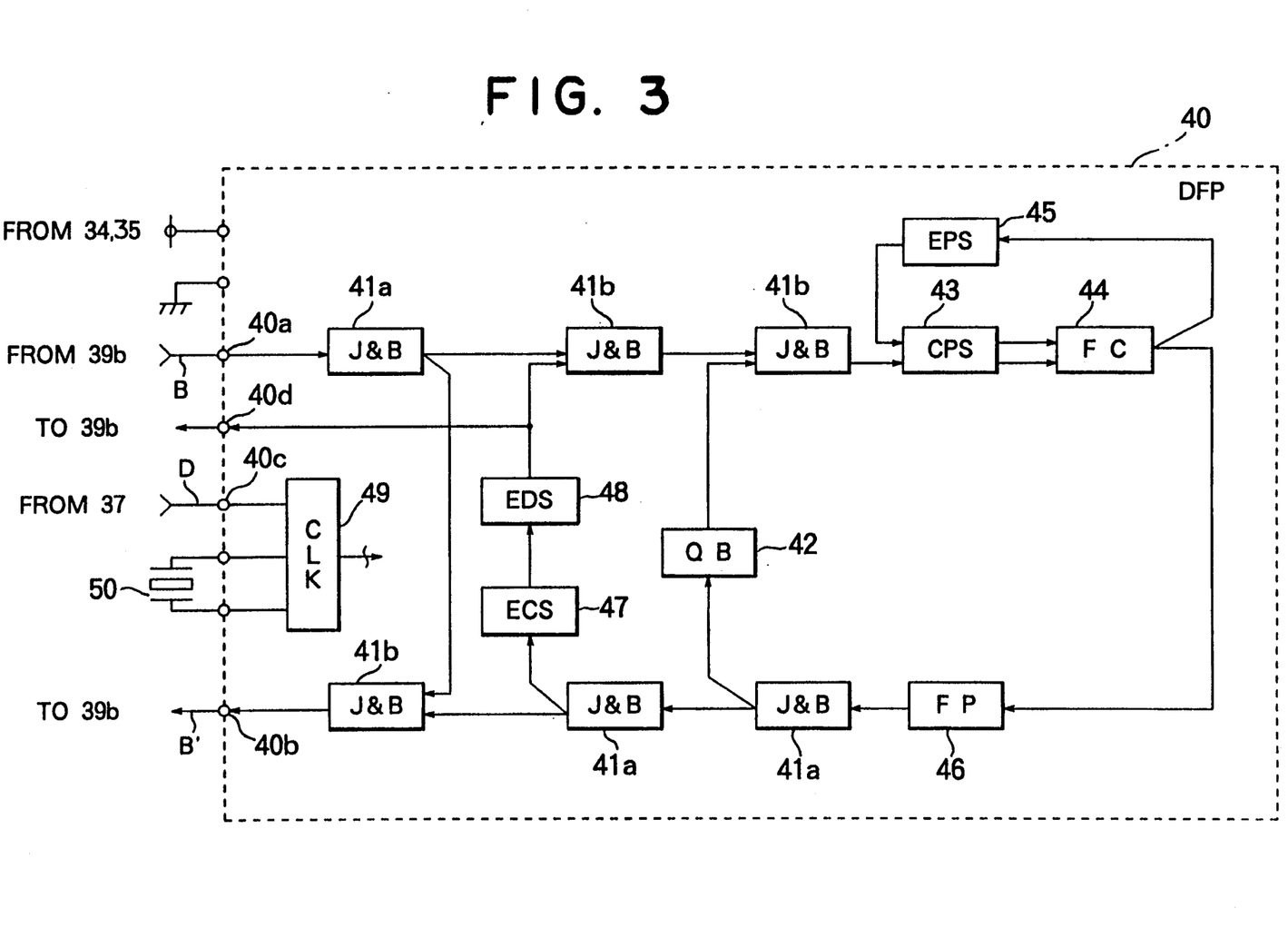
FIG. 3 is a block diagram showing a structure of a data flow processor constituting a part of the signal processing apparatus shown in FIG. 1.

FIG. 3 is a block diagram showing a structure of the data flow processor 40. This processor substantially corresponds to the one disclosed in Shima et al's "An Approach For Data-Driven Type Processor Oriented Development Aiding Tools": The Information Processing Society of Japan, Parallel Processing Symposium JSPP, 1989, pp. 281–288 except that a function for holding data upon interruption of power supply is added.

Referring to FIG. 3, the data flow processor 40 has a variety of terminals including an input terminal 40a for fetching the packet B supplied from the packet interface (I/F) unit 39b, an output terminal 40b for sending a processed packet B' to the packet interface unit 39b, an input terminal for fetching a power supply interruption signal D from the power supply interruption detecting circuit 37, and an input/output terminal 40d for extracting as a signal source the content of the data store of the DFP through the packet interface unit 39b for the purpose of monitoring or modifying the data.

A plurality of join and branch chips (J&B) 41a and 41b are inserted in a loop for processing the packet (token) B to generate the packet (token) B', wherein the join/branch chip (J&B) 41a serves for the branching function while the join/branch chip (J&B) 41b serves for the joining function.

A queue buffer (QB) 42 having internally 32 queuing stages is inserted in a feedback path extending from one join/branch 41a located within a lower loop, as viewed in FIG. 3, to one join/branch chip (J&B) 41b located within an upper loop. A cache program store (CPS) 43 storing a program for arithmetic operation (firing processing) for the input packet B is inserted between the join/branch chip (J&B) 41b located at the exit of the upper loop and the join/branch chip 41a located at the entrance of the lower loop. A firing controller (FC) 44 is inserted at the output side of the cache program store (CPS) 43 for outputting a signal containing an operation code and binomial operands. An extended program store (EPS) 45 extending externally of the cache program store (CPS) 43 is inserted between the exit of the firing controller (FC) 44 and the cache program store (CPS) 43 so that the extended program store (EPS) can be accessed as requires. An arithmetic or firing processor (FP) 46 is inserted between the firing controller (FC) 44 and the join/branch chip (J&B) 41a for executing arithmetic operation when the operation code and the binomial operands contained in the packet output from the firing controller (FC) 44 indicate the firing (arithmetic operation).

A serial connection of a color/stack manager (ECS) 47 located externally and a data store (EDS) 48 including externally extended ROM and RAM is inserted in another feedback path which extends from the join/branch chip (J&B) 41a of the lower loop to the cache program store (CPS) 43 via the join/branch chip (J&B) 41b. Finally, a reference numeral 49 denotes a clock control circuit (CLK) which responds to the power supply interruption signal D input through the input terminal 40c, and a reference numeral 50 denotes an oscillator driven under the control of the clock control circuit (CLK) 49.

Now, referring to FIGS. 2 and 3, description will turn to the operation of the data flow processor of the configuration described above.

The packet (token) B having the format shown in FIG. 2 is fetched by the data flow processor 40 through the input terminal 40a to be loaded in the cache program store (CPS) 43 after having passed through three join/branch chips (J&B) 41a and 41b. The cache program store (CPS) 43 is linked with the extended program store (EPS) 45 in such a manner that the succeeding destination node for the packet (token) B having passed through the firing controller (FC) 44 is triggered and that a program required for the subsequent processing is taken out from the extended program store (EPS) 45 to be temporarily stored in the cache program store (CPS) 43.

The cache program store (CPS) 43 determines on the basis of the destination node number or identifier contained in the packet B the succeeding destination node number or identifier, operation code, select code for corresponding hardware and others to thereby generate a new tag to be affixed. More specifically, the program stored in the cache program store (CPS) 43 circulates the packet B through the feedback loop including the queue buffer (QB) 42 until the data of the packet B has assumed the state required by the program in the CPS 43. When all the data are made available, the firing controller 44 determines the packet (token) as indicating the firing, whereupon the arithmetic operation is performed on the packet by the firing processor (FP) 46.

In the case of monomial operation, the firing controller (FC) 44 outputs the packet intactly to the firing processor (FP) 46 as the packet indicating the firing. In the case of binomial operation, the firing controller (FC) determines an operand pair, i.e., a pair of first and second operands, whereupon the packet to undergo the arithmetic operation is output to the firing processor (FP) 46 as the packet indicating the firing.

The processor (FP) 46 performs arithmetic operation in accordance with the operation (instruction) code "OPC" contained in the input packet, and then decision is made as to whether the packet undergone the arithmetic operation is to be outputted from the output terminal 40b through the branching function of the succeeding join/branch chip (J&B) 41a.

If the packet is not to be outputted, it is fed back to the cache program store 43 from the succeeding join/branch chip (J&B) 41a via the queue buffer (QB) 42 and the join/branch chip 41b dr alternatively the packet is stored in the cache program store 43 via the color and stack manager (ECS) 47 and the data store (EDS) 48.

If the packet of concern is to be output, it is sent out to he packet interface unit 39b from the join/branch chip (J&B) 41b through the output terminal 40b. Further, the content of the data store (EDS) 48 is extracted through the input/output terminal 40d for the monitoring or modification when occasion requires.

On the other hand, when the power supply interruption signal D is generated in response to opening of the key switch 2, the clock controller (CLK) 49 stops oscillation of the oscillator 50 in response to the power supply interruption signal D to thereby stop the internal clocking in the data flow processor 40, while inhibiting write operation to the RAM incorporated in the data store 48 to thereby hold the content thereof.

As will be appreciated from the foregoing description, the packet B produced from the packet interface unit 39b undergoes arithmetic operation in accordance with a program stored in the cache program store 43 of the data flow processor 40, whereby the output data can be generated by the timing port controller 39a on the basis of the processed packet B' which is obtained through the above-mentioned arithmetic operation. Further, the content of the extended data store 48 of the data flow processor 40 can be monitored or modified through the input/output terminal 40d. Besides, in response to the power supply interruption signal D, saving of power from consumption as well as data holding for the data stored in the data store 48 can be realized.

For the reasons mentioned above, the arithmetic data processing can be effected at an extremely high speed without sacrificing the accurate control capability when compared with the hitherto known signal processing apparatus whose operation is based only on the central processing unit or CPU 32 (FIG. 4).

Many features and advantages of the present invention are apparent from the detailed specification and thus it is intended by the appended claims to cover all such features and advantages of the system which fall within the true spirit and scope of the invention. For example, although the invention has been described in conjunction with the engine control, the invention is never limited thereto but can find many other applications. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

We claim:

1. A signal processing apparatus for generating a variety of output data by performing arithmetic operation on input data supplied in the form of digital signals and analog signals on a real time basis, comprising:

an analog-to-digital converter for converting said analog signal into a corresponding digital signal;

a packet interface for generating a data packet in accordance with said digital signal;

a timing port controller for controlling the timing at which said analog-to-digital converter operates and for generating said output data in accordance with said data packet;

a power supply interruption detecting circuit for generating a power supply interruption detecting signal in response to detection of a voltage drop of a power supply source; and a data flow processor including a data storage and a data flow loop for processing said data packet in accordance with tag information contained in said data packet, wherein said data flow processor, in response to said power supply interruption detecting signal, reduces its consumption of power from said power supply and causes said data storage to continue storing data already stored therein.

2. A signal processing apparatus according to claim 1, wherein said data flow processor further includes an input/output terminal for providing contents of said data storage to said packet interface as a source signal; and wherein values preset in said data storage are sent out to said packet interface via said input/output terminal in accordance with an initialization routine to allow said packet interface to latch values from said data storage for establishing correspondence in data type between said input data and said output data.

3. A signal processing apparatus for generating a variety of output data by performing arithmetic operation on input data supplied in the form of digital signals and analog signals on a real time basis, comprising:

an analog-to-digital converter for converting said analog signal into a corresponding digital signal;

a packet interface for generating a data packet in accordance with said digital signal;

a timing port controller for controlling the timing at which said analog-to-digital converter operates and for generating said output data in accordance with said data packet;

a power supply interruption detecting circuit for generating a power supply interruption detecting signal in response to detection of a voltage drop of a power supply source; and a data flow processor including a data storage and a data flow loop for processing said data packet in accordance with tag information contained in said data packet, wherein said data flow processor, in response to said power supply interruption detecting signal, reduces its consumption of power from said power supply and causes said data storage to continue storing data already stored therein, wherein said data packet includes data and said tag information including a destination node identifier; and wherein said data flow processor further includes:
- a plurality of join/branch chips for at least one of joining and branching said data packet loaded in said data flow loop;
- a program memory for reading out a succeeding destination node identifier, operation code and a select code for corresponding hardware to replace said existing tag with a new tag to create a new data packet;
- a firing controller for generating a modified data packet including an operation code and a binomial operand in accordance with said new data packet supplied from said program memory;
- a queue buffer in a feedback loop extending from said firing controller to said program memory for queuing said new data packet; and
- an arithmetic operation processing unit for performing arithmetic operations in accordance with said succeeding destination node identifier and information of said binomial operand in said modified data packet supplied from said firing controller and, based on a result of said arithmetic operations, one of returning said packet to said program memory via said feedback loop and outputting said packet to said packet interface.

4. A signal apparatus according to claim 2, wherein said data flow processor further includes an input/output terminal for providing contents of said data storage to said packet interface as a source signal; and wherein values preset in said data storage are sent out to said packet interface via said input/output terminal in accordance with an initialization routine to allow said packet interface to latch values from said data storage for establishing correspondence in data type between said input data and said output data.

5. A signal processing apparatus for generating a variety of output data by performing arithmetic operation on input data supplied in the form of digital signals and analog signals on a real time basis, comprising:
- an analog-to-digital converter for converting said analog signal into a corresponding digital signal;
- a packet interface for generating a data packet in accordance with said digital signal;
- a timing port controller for controlling the timing at which said analog-to-digital converter operates and for generating said output data in accordance with said data packet;
- a power supply interruption detecting circuit for generating a power supply interruption detecting signal in response to detection of a voltage drop of a power supply source; and
- a data flow processor including a data storage and a data flow loop for processing said data packet in accordance with tag information contained in said data packet, wherein said data flow processor, in response to said power supply interruption detecting signal, reduces its consumption of power from said power supply and causes said data storage to continue storing data already stored therein, wherein said data packet includes data and said tag information including a destination node identifier; and wherein said data flow processor further includes:
- a plurality of join/branch chips for at least one of joining and branching said data packet loaded in said data flow loop;
- a program memory for reading out a succeeding destination node identifier, operation code and a select code for corresponding hardware to replace said existing tag with a new tag to create a new data packet;
- a firing controller for generating a modified data packet including an operation code and a binomial operand in accordance with said new data packet supplied from said program memory;
- a queue buffer in a feedback loop extending from said firing controller to said program memory for queuing said new data packet; and
- an arithmetic operation processing unit for, when said modified data packet supplied from said firing controller indicates firing, performing arithmetic operations in accordance with said succeeding destination node identifier and information of said binomial operand in said modified data packet supplied from said firing controller and one of outputting said modified data packet to said packet interface and returning said modified data packet to said program memory, and for returning said modified data packet to said program memory via said feedback loop when said modified data packet supplied from said firing controller indicates no firing.

6. A signal processing apparatus according to claim 5, wherein said data flow processor further includes an input/output terminal for providing contents of said data storage to said packet interface as a source signal; and wherein values preset in said data storage are sent out to said packet interface via said input/output terminal in accordance with an initialization routine to allow said packet interface to latch values from said data storage for establishing correspondence in data type between said input data and said output data.

* * * * *